May 4, 1948.  J. N. KUZMICK  2,440,960
MOLD FOR SLIDE FASTENERS
Filed Oct. 7, 1944  2 Sheets-Sheet 1
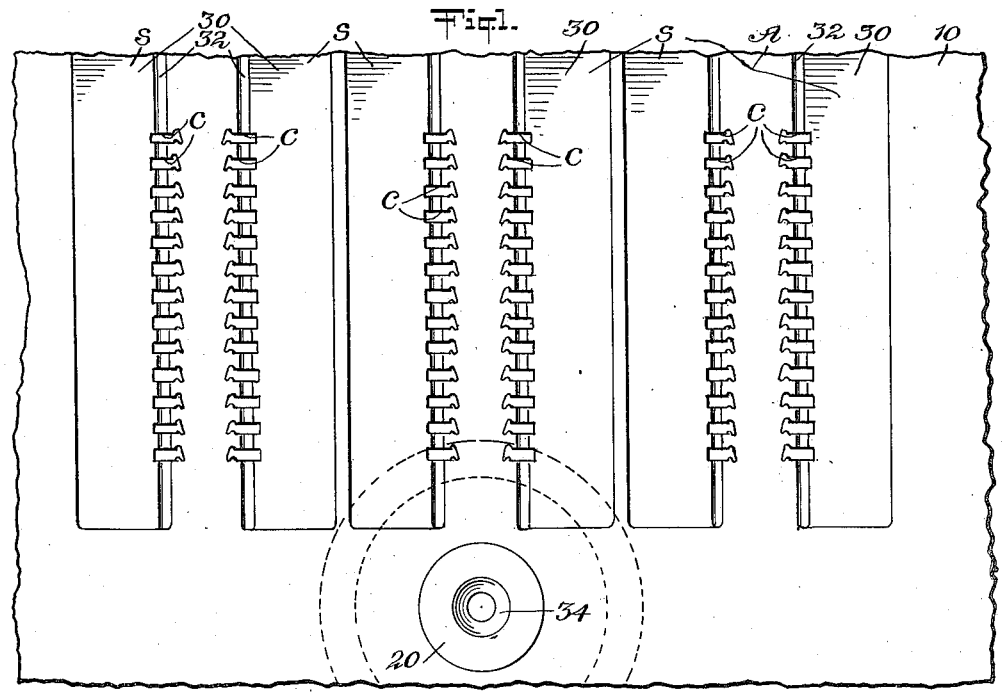
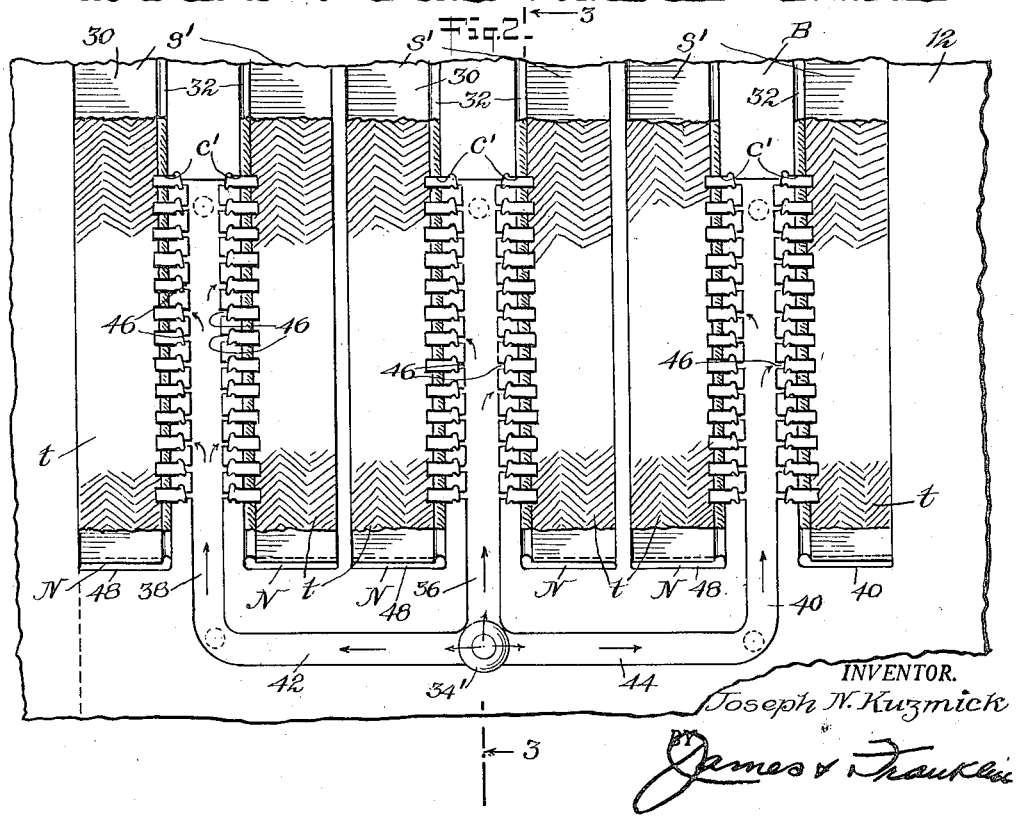
INVENTOR.
Joseph N. Kuzmick
ATTORNEYS

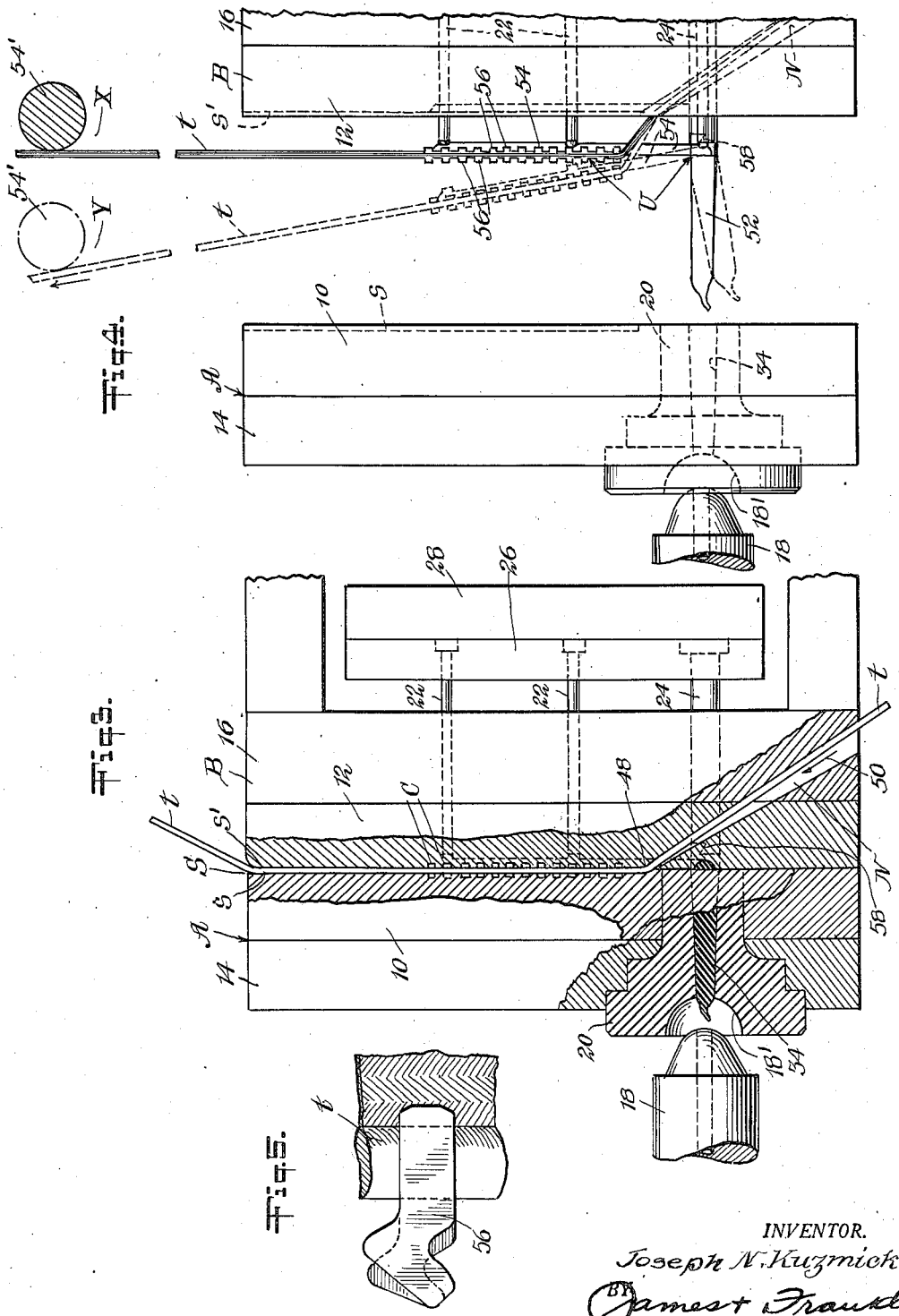

Patented May 4, 1948

2,440,960

UNITED STATES PATENT OFFICE 2,440,960

MOLD FOR SLIDE FASTENERS

Joseph N. Kuzmick, Clifton, N. J., assignor to Conmar Products Corporation, Newark, N. J., a corporation of New Jersey Application October 7, 1944, Serial No. 557,581

14 Claims. (Cl. 18—36)

This invention relates to the molding of slide fasteners.

The prime object of the invention centers about the provision of molding apparatus for simultaneously molding as by injection or die casting and the like, groups of slide fastener elements directly onto a plurality of separate tapes.

In a known prior method of molding one or a group of slide fastener elements directly onto a tape, the tape is fed through a mold, such as a two-part mold, in the parting plane of the mold, and is positioned or seated during a molding step in the parting plane. The molding material injected or die-cast into the mold is fed to the slide fastener element mold cavities (spaced along the beaded edge of the tape) from a sprue hole to and through passageways or runners also located in the parting plane of the mold. In prior molding methods of this type, only one tape is fed into the mold; and two tapes are the most that can possibly be so fed. The reason for this limitation is that the tapes and the runners would intersect each other should more than two tapes be fed through the mold.

The principal object of the present invention is the provision of a molding apparatus in which more than two tapes may be simultaneously fed through and positioned in the parting plane of the mold and in which groups of slide fastener elements may be directly molded onto such tapes by molding material which is injected to and fed through runners also located in the parting plane of the mold, all without the development of any intersecting interference between the tapes and the runners.

Other and ancillary objects pertain to the provision of a molding apparatus of this nature which is simply arranged and inexpensive to machine.

To the accomplishment of the foregoing objects and such other objects as may hereinafter appear, my invention relates to the molding apparatus sought to be defined in the appended claims and described in the following specification, taken together with the accompanying drawings in which:

Fig. 1 is an elevational and fragmentary view of one part of a two-part mold, this view showing the parting surface or parting plane of this mold part;

Fig. 2 is an elevational and fragmentary view of the second part of the two-part mold which is mateable with the mold part of Fig. 1, this view also showing the parting surface or parting plane of this part of the mold, and also showing six slide fastener stringers molded according to the principles of the present invention;

Fig. 3 is a view shown on an enlarged scale taken in cross-section in the planes of the broken line 3—3 of Fig. 2, this view illustrating the mold in closed position;

Fig. 4 is a partial or fragmentary view of the same showing the mold in open position and schematically illustrating the tape feed, and Fig. 5 is a view of an elemental portion of a stringer illustrating one of the types of slide fastener element which may be produced in the mold.

Referring now more in detail in the drawings, and having reference first to Figs. 3 and 4 thereof, the molding apparatus comprises a two-part mold consisting of the relatively stationary mold A and the relatively movable mold B. The relatively stationary mold A comprises the mold part 10 carried by a backing plate 14. Relatively movable mold B comprises the mold part 12 secured to and carried by a backing plate 16. The mold A may be moved for insertion of a nozzle 18 selected from different lengths of nozzles, but while so movable the mold A is stationary during production runs. The nozzle 18 which is shown in a retracted position fits a corresponding recess 18' formed in an insert 20 fitted into the parts 10 and 14 of the mold A. Knockout pins 22 and a sprue puller 24, all fastened to a plate 26 mounted on and moved by a supporting block or yoke 28, complete the essential parts of the mold.

The molds A and B are provided with tape seats which mate in the parting plane of the mold and with slide fastener element cavities which also mate in the parting plane of the mold. The mold A, and particularly the mold part 10 thereof, is thus provided or formed with a plurality of mold seats s, s, and the mold B, and particularly the mold part 12 thereof, is provided with the mating tape seats s', s', which seats mate in the parting plane of the mold to form the composite seats S, S (see Fig. 3) for seating the beaded tapes t, t. The seats s and s' are machined in the faces of the mold parts 10 and 12 in form to define the composite seats or passageways S, S for the beaded tapes; and each seat, therefore, is made to comprise a cavity 30 and a side terminal channel 32 having a depth equal to one-half the thickness of the tape and tape bead respectively. The mold part 10 is also formed with a plurality of slide fastener element cavities c, c arranged in groups, a group being associated with a tape seat; and the cavity elements of the group are spacedly arranged along the channel 32 of such seat. The mold part 12 is similarly provided with the slide fastener element cavities c', c' arranged in corresponding groups, a group associated with each seat s'; and the elements of such group are also spacedly arranged along the length of a chanel 32 of such seat. The groups of cavity c in the mold part 10 mate with the corresponding groups of cavities c' in the mold part 12 to form the composite or completed slide fastener element cavities C (see Fig. 3), the mating being in the parting plane of the mold.

In the form of the apparatus shown in the drawings provision is made for the molding of six groups of slide fastener elements onto six parallelly arranged tapes. There are thus provided in each of the mold parts 10 and 12, tape seats forming or defining six composite tape seats S and groups of slide fastener elements and cavities forming or defining six composite or completed groups of slide fastener element cavities C.

For leading the molding material from a common nozzle 18 to all of the groups of slide fastener element cavities C the mold parts 10 and 12 are formed with passageways or runners. The insert 20 in the stationary mold A is formed with a flaring sprue channel 34. The sprue channel is that part of the path of the plastic flow which connects the nozzle 18, when in engagement with the mold, with the runners. The term "runners" is used herein to comprise all of the passageways for the further routes traveled by the molding material from the sprue channel 34 to the mold cavities C, C. In the particular molding apparatus shown in the drawings the runners are formed only in the mold part 12 (the movable mold), this for the purpose of simplifying the construction. These runners begin at the recess 34' formed in the mold part 12, which recess is in terminal alignment with the sprue channel 34, and lead into the central channel 36 and the two side channels 38 and 40, all arranged parallelly and parallel with the running of the tapes t, t the communication of these channels from the recess 34' being directly into the central channel 36 and by way of the oppositely directed branch channels 42 and 44 into the side channels 38 and 40. The main parallel channels 36, 38 and 40 connect by means of the element channels 46—46 to the element cavities c'. As will be apparent, these runners, all formed in the face of the movable mold part 12, lie in the parting face of the mold, A, B and are open at the parting face or plane of the mold. By means of this construction the molding material injected or die-cast into the mold from the nozzle 18 flows first through the sprue channel 34 of the stationary mold, thence through the sprue recess 34' into and through the described runners, to and into the groups of mold cavities C, C, the molding material flowing through the runner paths in the directions indicated by the arrows shown in Fig. 2 of the drawings.

As heretofore set forth, the object of the present invention is the provision of a molding method and apparatus in which more than two tapes (and six tapes have been illustrated in the exemplification shown in the drawings) may be simultaneously fed through and positioned in the parting plane of the mold and in which groups, such as the groups C, C, of slide fastener elements may be directly molded onto such tapes by molding material which is injected to and fed through the runners also located in the parting plane of the mold. In accordance with the principles of the present invention this is achieved by a method which consists generically in feeding a tape, such as t, first through a channel or tape passage in the body of the mold and thence into the parting plane of the mold, the tape emerging from the channel and entering the parting plane of the mold at a region spaced beyond the branch or transversely arranged runner such as the runner 42 or 44, or both. By means of this method the feeding of the molding material and the feeding of the tape are kept out of intersecting relation and, therefore, out of intersecting interference. To accomplish these results and attain this object, the feed for the tapes t, t which would intersect the path of the branch runners 42, 44, or both, and for the sake of uniformity the feed for each of the tapes t, t is taken through a channel in the body of the movable mold B which opens into and communicates with the tape seats in this mold part, the channel and tape seats forming a passageway for the feeding of the tape through the mold, the channel opening into said tape seats at a region spaced beyond the transversely arranged runner or runners. Preferably, a separate channel is formed in the mold B for each tape seat s' therein. Thus the mold B is provided with the plurality of channels or tape passages N, N formed in the body of the mold, each individual to a tape seat s', the channels opening into and communicating with the tape seats at the region or points 48—48. The channel or tape passage N and the tape seat s' form for each tape the passageway for the feeding of the tape through the mold, each tape t being fed through the mold in the direction indicated by the arrow 50 in Fig. 3 of the drawings. The point or region of emergence 48 of the channel N is spaced beyond or above the transversely arranged runners 42 and 44, and thus intersection and interference between the branch channels 42 or 44, or both, and the tapes t, t thereabove is entirely obviated. Thus, the branch or transversely arranged runners lying in the face of the mold and opening into the plane of the mold may be coordinated with tape seats also lying in the face or faces of the mold and opening into the parting plane of the mold, whereby a plurality such as more than two tapes may be simultaneously fed through the mold for the simultaneous molding directly onto these tapes of groups of slide fastener elements.

Reference now being made to Figs. 3 and 4, a cycle operation of the molding apparatus disclosed is as follows:

The plurality of tapes t, t are fed, while the mold is open, in the direction indicated by the arrow 50 in Fig. 3. The mold is then closed, the tapes t, t being thereby positioned in their seats s, s. The molding material is then ejected through the nozzle 18 while in close contact with the mold, and injected through the sprue hole 34, 34' and all of the runners to the fastener element cavities C, C. At the end of each molding step the molding material solidifies in the scoop cavities C, C, the runners 36 to 46 and the sprue hole 34, 34', and forms together with all the tapes single units generally designated as U in Fig. 4. These units, comprising for each tape, the tape t, the extracted sprue 52, the runner bars 54, and the molded slide fastener elements 56, 56, move along with the movable mold B when the mold is opened. The sprue puller 24 is undercut at its outer end 58, and the hook thus formed engages the formed sprue 52, holding the unit in place in the moving part B. The movable mold part then moves to the position shown in Fig. 4.

The step following the molding and opening of the mold consists in the separation of the above referred to units U from the movable mold part B and includes two different operations, first, the separation of the units from the movable mold part proper by means of the knockout pins 22, 22 and, second, the separation of the units from the knockout pins. The first separating operation is effected by the plate 26 and yoke 28 moving inwardly with respect to the mold part B. In order to carry out the second separating operation, tape guides 54', over which the tapes $t, t$ are fed, are then moved from the full line positions X to the dotted line positions Y, shown in Fig. 4, whereby the units break away from the knockout pins 22, 22 and the sprue puller 24, whereupon the tapes $t, t$ and the molded units U, assume the position indicated by dotted lines in Fig. 4.

When the tapes and molded units are in the inclined position indicated by the dotted lines in Fig. 4, the next immediate operation, namely, the tape feed, may take place. The molded stringers (tapes and units) are moved out of the mold A, B and are then trimmed. The trimming consists of removing by cutting from the molded tape section, the sprue 52, runner bars 54, and the side runners leading to the elements. Fresh tape portions are brought into the molding space by the tape feeding operation for a new molding cycle.

In Fig. 5, I show a type of slide fastener element 56 that may be molded onto the tape $t$ with the disclosed apparatus. An element of this general nature is preferred since it may be molded without the use of cores; although it will be understood that the method and apparatus of the present invention may be practiced and used with molds having separate cores. An element of the type shown in Fig. 5 is disclosed in the copending application of Richard Low, Serial No. 482,345, filed April 8, 1943, now Patent No. 2,361,782.

It will be observed that if only two tapes, such as the tapes on opposite sides of the median longitudinal plane of the mold were to be molded, the principles of the present invention would not have to be employed, since only the longitudinal runner 36 would then be adequate. The fundamental principle of the invention is brought into being when a tape fed in the parting plane of the mold lies astride a transverse runner such as 42 or 44 which also lies in the parting plane of the mold, as is the case where more than two tapes are to be simultaneously operated upon. The apparatus disclosed embodies a convenient arrangement when six tapes are to be simultaneously molded. Other arrangements of the runners may obviously be used.

It is preferred to arrange the tape passages or channels N so that they make as small an angle as possible with the parting plane. In this manner undue stretching of the tapes due to the fact that they are fed around the corners or bends 48 is minimized.

It will be apparent that many changes may be made in the steps of the disclosed method and in the parts of the molding apparatus without departing from the spirit of the invention as defined in the following claims.

I claim:

1. A molding apparatus for molding slide fastener elements directly onto a tape comprising a two-part mold provided with a tape seat and slide fastener element cavities located in the parting plane of the mold and provided with runners for the molding material in at least one of the mold parts lying in the parting face thereof and open at the parting plane thereof, the said runners including a runner arranged transversely of the tape seat and a runner arranged longitudinally of the tape seat, the transverse runner communicating with and leading to the longitudinal runner and the latter leading to said element cavities, a tape passage disposed at an angle to the parting plane and passing through the body of one of said mold parts and opening into and communicating with the tape seat therein, the tape passage and tape seat forming a path for the feeding of the tape through the mold, the tape passage opening into said tape seat at a region between one end of the tape seat and the transversely arranged runner, whereby the feeding path of the molding material and the feeding path of the tape are out of intersecting relation.

2. A molding apparatus for molding slide fastener elements directly onto a plurality of tapes comprising a two-part mold for a plurality of tapes provided for each tape with a tape seat and a set of slide fastener element cavities located in the parting plane of the mold, runners for the molding material in at least one of the mold parts lying in the parting face thereof and open at the parting plane thereof, the said runners including a runner arranged transversely of the tape seats and a runner arranged longitudinally of the tape seats, the transverse runner communicating with and leading to the longitudinal runner and the latter leading to at least one set of element cavities, tape passages disposed at an angle to the parting plane and passing through the body of one of said mold parts and opening into and communicating with the tape seats therein, the tape passages and tape seats forming paths for the feeding of the plurality of tapes through the mold, the tape passages opening into said tape seats at regions between one end of each of the tape seats and the transversely arranged runner, whereby the feeding path of the molding material and the feeding path of the tapes are out of intersecting relation.

3. A molding apparatus for molding slide fastener elements directly onto a group of three or more parallelly arranged tapes comprising a two-part mold for the group of tapes provided for each tape with a tape seat and a set of slide fastener element cavities located in the parting plane of the mold, runners for the molding material in at least one of the mold parts lying in the parting face thereof and open at the parting plane thereof, the said runners including runners arranged longitudinally of the tape seats and leading to the plurality of sets of element cavities and communicating runners arranged transversely of the tape seat and leading from a single sprue channel to all of the longitudinal runners, tape passages disposed at an angle to the parting plane and passing through the body of one of said mold parts and opening into and communicating with the tape seats therein, the tape passages and tape seats forming paths for the feeding of the plurality of tapes through the mold, the tape passages opening into said tape seats at regions between one end of each of the tape seats and the transversely arranged runners, whereby the feeding paths of the molding material and the feeding paths of the tapes are out of intersecting relation.

4. A molding apparatus for molding slide fastener elements directly onto a tape comprising a two-part mold provided with mating tape seats and slide fastener element cavities mating in the parting plane of the mold, one of said mold parts being provided with a sprue channel, the second of said mold parts being provided with runners for the molding material leading from said sprue channel and lying in the parting face and open at the parting plane of said second mold part, the said runners including a runner arranged transversely of the tape seat and a runner arranged longitudinally of the tape seat, the transverse runner leading to the longitudinal runner and the latter leading to said element cavities, a tape passage disposed at an angle to the parting plane and passing through the body of said second mold part opening into and communicating with the tape seat therein, the tape passage and tape seats forming a path for the feeding of the tape through the mold, the tape passage opening into said tape seat at a region between one end of the tape seat and the transversely arranged runner, whereby the feeding path of the molding material and the feeding path of the tape are out of intersecting relation.

5. In the molding apparatus of claim 4, means for ejecting from said second mold part, when the two parts of the mold are separated, the tape, the elements molded thereto and the attached runner strips and sprue.

6. A molding apparatus as defined in claim 3, in which the mold parts are a cover die and an ejector die, and in which the ejector die includes appropriate ejector pins for ejecting the tape and fastener elements, the longitudinal runner strips, and the cross-runner strip.

7. A molding apparatus as defined in claim 3, in which a tape guide means receives the tapes leaving the mold and pulls the tapes in angular relation to the parting plane of the mold when the mold is opened, thereby stripping the tapes, elements and runner strips from the mold.

8. A molding apparatus as defined in claim 3, in which the mold parts are a cover die and an ejector die, and in which the ejector die includes appropriate ejector pins for ejecting the tape and fastener elements, the longitudinal runner strips, and the cross-runner strip, and in which a tape guide means receives the tapes leaving the mold pulls the tapes in angular relation to the parting plane of the ejector die when the die is opened, thereby stripping the tapes, elements and runner strips from the ends of the ejector pins.

9. A molding apparatus for molding slide fastener elements directly onto three or more tapes simultaneously, said apparatus comprising separable mold halves having three or more collateral tape seats in the parting plane of the mold, slide fastener element cavities located in the parting plane along the tape seats, runners arranged longitudinally of the tape seats and communicating with the element cavities, said runners extending beyond the ends of the tape seats, a cross-runner connecting the longitudinal runners, a sprue leading to the cross-runner, and three or more tape feed passages passing through one of the mold halves at an angle to the parting plane and leading to the ends of the tape seats, thereby avoiding intersection with the aforesaid cross-runner.

10. A molding apparatus as defined in claim 9, in which the mold halves are a cover die and an ejector die, and in which the ejector die includes appropriate ejector pins for ejecting the tape and fastener elements, the longitudinal runner strips, and the cross-runner strip.

11. A molding apparatus as defined in claim 9, in which a tape guide means receives the tapes leaving the mold and pulls the tapes in angular relation to the parting plane of the mold when the mold is opened, thereby stripping the tapes, elements and runner strips from the mold.

12. A molding apparatus as defined in claim 9, in which the mold halves are a cover die and an ejector die, and in which the ejector die includes appropriate ejector pins for ejecting the tape and fastener elements, the longitudinal runner strips, and the cross-runner strip, and in which a tape guide means receives the tapes leaving the mold and pulls the tapes in angular relation to the parting plane of the ejector die when the die is opened, thereby stripping the tapes, elements and runner strips from the ends of the ejector pins.

13. A molding apparatus for molding slide fastener elements directly onto a tape, said apparatus comprising mold halves having a tape seat and slide fastener element cavities located in the parting plane of the mold and having a runner extending longitudinally of the tape seat and communicating with the element cavities, a tape guide means for receiving the tape outside the mold, said tape guide means being so arranged as to pull the tape away from the parting plane of the mold when the mold is opened, thereby stripping the tape, elements and runner strip from the mold.

14. A molding apparatus for molding slide fastener elements directly onto a tape, said apparatus comprising a cover die and an ejector die having a tape seat and slide fastener element cavities located in the parting plane of the mold and having a runner extending longitudinally of the tape seat and communicating with the element cavities, said ejector die including appropriate ejector pins for ejecting the tape and fastener elements and longitudinal runner strip, a tape guide means for receiving the tape outside the mold, said tape guide means being so arranged as to pull the tape away from the parting plane of the ejector die when the die is opened, thereby stripping the tape, elements and runner strip from the ends of the ejector pins.

JOSEPH N. KUZMICK.

REFERENCES CITED

The following references are of record in the file of this patent:

UNITED STATES PATENTS

| Number | Name | Date |
| --- | --- | --- |
| 1,960,997 | Halloran | May 25, 1934 |
| 2,288,899 | Gits | July 7, 1942 |
| 2,341,404 | Winterhalter | Feb. 8, 1944 |

FOREIGN PATENTS

| Number | Country | Date |
| --- | --- | --- |
| 361,092 | Great Britain | Nov. 19, 1931 |